United States Patent
Tsuchida et al.

(10) Patent No.: US 10,810,174 B2
(45) Date of Patent: Oct. 20, 2020

(54) DATABASE MANAGEMENT SYSTEM, DATABASE SERVER, AND DATABASE MANAGEMENT METHOD

(71) Applicant: Hitachi, Ltd., Tokyo (JP)

(72) Inventors: Takayuki Tsuchida, Tokyo (JP); Michiko Tanaka, Tokyo (JP); Akira Shimizu, Tokyo (JP); Shinji Fujiwara, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 336 days.

(21) Appl. No.: 15/561,221

(22) PCT Filed: Apr. 13, 2015

(86) PCT No.: PCT/JP2015/061325
§ 371 (c)(1),
(2) Date: Sep. 25, 2017

(87) PCT Pub. No.: WO2016/166789
PCT Pub. Date: Oct. 20, 2016

(65) Prior Publication Data
US 2018/0349422 A1     Dec. 6, 2018

(51) Int. Cl.
| | | |
|---|---|---|
| G06F 17/00 | (2019.01) |
| G06F 16/22 | (2019.01) |
| G06F 16/23 | (2019.01) |
| G06F 16/2455 | (2019.01) |
| G06F 16/00 | (2019.01) |
| G06F 16/21 | (2019.01) |
| G06F 3/06 | (2006.01) |

(52) U.S. Cl.
CPC ............ *G06F 16/221* (2019.01); *G06F 3/064* (2013.01); *G06F 3/067* (2013.01); *G06F 3/0611* (2013.01); *G06F 16/00* (2019.01); *G06F 16/211* (2019.01); *G06F 16/2365* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 2010/0205351 A1 | 8/2010 | Wiener et al. |
| 2011/0016157 A1 | 1/2011 | Bear et al. |
| 2015/0100556 A1* | 4/2015 | Sekiguchi | H03M 7/30 707/693 |
| 2015/0213107 A1* | 7/2015 | Park | G06F 16/2365 707/602 |

(Continued)

OTHER PUBLICATIONS

International Search Report of PCT/JP2015/061325 dated Jul. 14, 2015.

*Primary Examiner* — Anhtai V Tran
(74) *Attorney, Agent, or Firm* — Mattingly & Malur, PC

(57) ABSTRACT

A database includes a plurality of data blocks. Each of the plurality of data blocks includes a plurality of data pages in which a plurality of column values recorded in one or more records corresponding to the data block are stored. Each of the plurality of data pages has two or more column values in one column corresponding to the data page stored therein. A database server selects a data block from the plurality of data blocks and specifies a data page to be scanned from the selected data block.

12 Claims, 11 Drawing Sheets

(56) References Cited

U.S. PATENT DOCUMENTS

| | | | | |
|---|---|---|---|---|
| 2015/0363445 A1* | 12/2015 | Konik | ............... | G06F 16/2237 |
| | | | | 707/745 |
| 2016/0147801 A1* | 5/2016 | Wein | ................. | G06F 16/221 |
| | | | | 707/609 |
| 2016/0253425 A1* | 9/2016 | Stoops | .............. | G06F 16/2255 |
| | | | | 707/754 |

* cited by examiner

FIG. 2 item table  201

| item_id | category | size | price |
|---------|----------|------|-------|
| 1 | 8 | L | 190 |
| 2 | 18 | S | 80 |
| 3 | 13 | L | 230 |
| 4 | 10 | M | 100 |
| 5 | 10 | L | 210 |
| 6 | 10 | L | 210 |
| 7 | 11 | L | 220 |
| 8 | 15 | S | 50 |
| ... | ... | ... | ... |

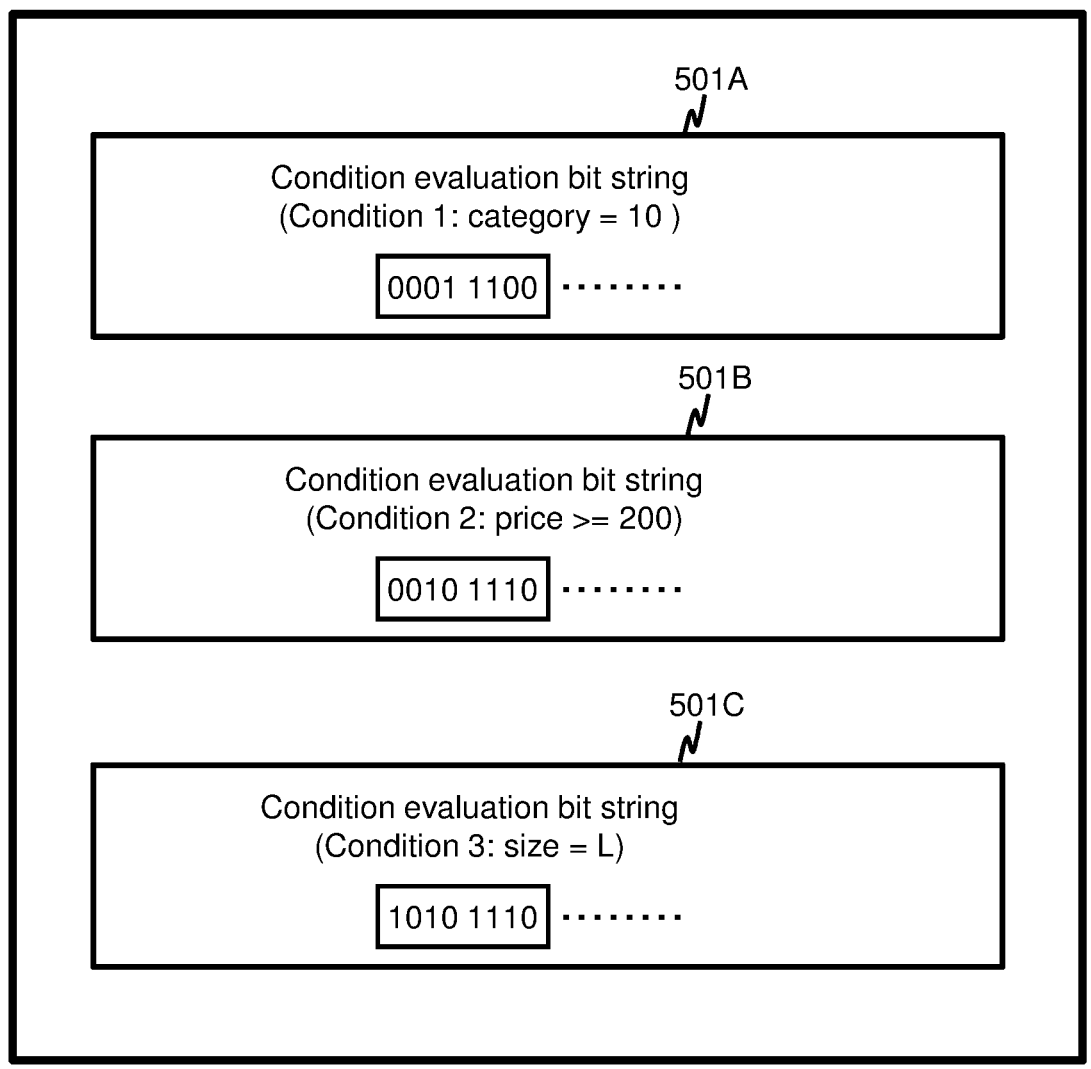

DATABASE MANAGEMENT SYSTEM, DATABASE SERVER, AND DATABASE MANAGEMENT METHOD

TECHNICAL FIELD

The present invention generally relates to database management.

BACKGROUND ART

Utilization of business data produced in large amounts is essential in corporate activities. As a database (hereinafter, a "DB") for accumulating and analyzing large amounts of business data in an efficient manner, a column store database (hereinafter, a "column store DB") is known. Generally, a database includes a table, the table has a plurality of rows, and a plurality of values (column values) respectively corresponding to a plurality of data items (columns) are recorded in each row. In a column store DB, a plurality of column values in a plurality of records are stored, for each column, in an area corresponding to the column. The column store DB can also be stored in a main storage memory of a server. However, usually, a main storage memory has a higher cost (for example, a higher bit cost) per unit capacity than an external storage apparatus. Therefore, with a system handling large-scale data, a column store DB is generally stored in an external storage apparatus.

As described above, in a column store DB, a plurality of column values in a plurality of records are stored, for each column, in an area corresponding to the column. Therefore, by reading only column values corresponding to a column to be analyzed from an external storage apparatus, an advantage is gained in that an amount of data to be read can be reduced as compared to a method of reading an entire DB. However, on the other hand, processing occurs in which one or more column values respectively corresponding to one or more columns are combined to reconfigure an original record (one "record" may share a same configuration as a single row or may be constituted by a part of the column values of a row). A system handling large-scale data handles an enormous amount of records. In order to process a query in a short period of time, it is important that a record reconfiguration process be executed at high speed.

Realizing a record reconfiguration process at high speed requires enabling a scan target area to be reduced in the record reconfiguration process.

For example, PTL 1 discloses the following technique. A PAX (Partition Attributes Across) page is prepared, and the PAX page is divided into a plurality of minipages respectively corresponding to a plurality of columns (for example, FIGS. 6A and 6B). A plurality of column values in a plurality of records in a row store page are stored, for each column, in a minipage. According to the technique described in PTL 1, all of the column values in a row store page are stored, for each column, in a minipage corresponding to the column. Since data of one record is entirely stored in one PAX page, a situation where column values necessary for a reconfiguration target record are stored across a plurality of pages does not occur. In other words, reconfiguration (restoration) of one record in one page is guaranteed.

For example, PTL 2 discloses the following technique. Each column is stored in a data file and each data file (column) is divided into a plurality of blocks. A position index is prepared for each column (FIGS. 5 and 6). A position (a start position and a file offset) of each block is recorded in each position index. According to the technique described in PTL 2, by referring to a position index corresponding to a processing target column, a block including a column value of a reconfiguration process target record can be specified from a block set (data file) corresponding to the processing target column. Therefore, a scan target area can be reduced as compared to a method of scanning an entire block set.

CITATION LIST

Patent Literature

[PTL 1]
  US 2010/0205351
[PTL 2]
  US 2011/0016157

SUMMARY OF INVENTION

Technical Problem

In PTL 1, while data processing is performed in column units (in minipage units), a scan target area cannot be reduced since reads are generally performed in page units, but in PTL 2, since reads are performed in units of column portions (in block units), a scan target area can be reduced.

Meanwhile, in PTL 1, reconfiguration of a record in a single PAX page is guaranteed. However, in PTL 2, reconfiguration of a record is not guaranteed. This is because the numbers of column values stored in the respective blocks are not necessarily the same. For example, there may be cases where even when two blocks are respectively read from two data files, column values necessary for a reconfiguration target record may be absent.

Therefore, even when the respective techniques of PTL 1 and PTL 2 are combined, guaranteeing record reconfiguration and increasing speed of a record reconfiguration process (reducing a scan target area) cannot be realized at the same time.

Solution to Problem

A database includes a plurality of data blocks. Each of the plurality of data blocks includes a plurality of data pages storing a plurality of column values recorded in one or more records corresponding to the data block. Each of the plurality of data pages stores two or more column values in one column corresponding to the data page. A database server selects a data block from the plurality of data blocks and specifies a data page that is a scan target from the selected data block.

Advantageous Effects of Invention

Both guaranteeing record reconfiguration and increasing speed of a record reconfiguration process (reducing a scan target area) can be realized at the same time.

BRIEF DESCRIPTION OF DRAWINGS

FIG. 2 shows an example of a table according to Embodiment 1.

FIG. 4 shows an example of a query according to Embodiment 1.

FIG. 5 shows an example of intermediate data according to Embodiment 1.

DESCRIPTION OF EMBODIMENTS

Figure 1:
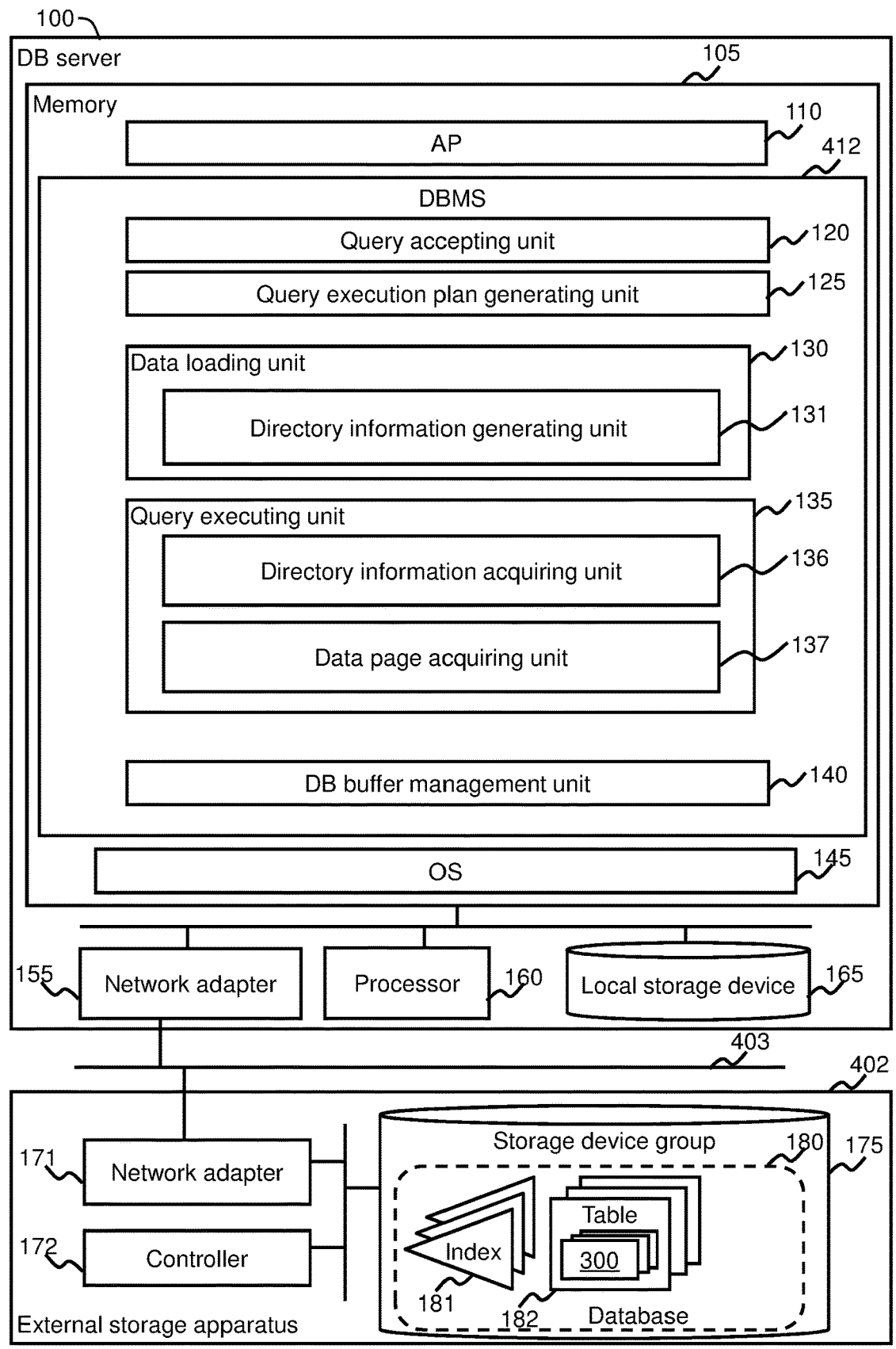
FIG. 1 shows a configuration example of a computer system according to Embodiment 1.

Hereinafter, several embodiments will be described with reference to the drawings. It is to be understood that the present invention is not in any way limited by the following description. In addition, in the following description, a database will be referred to as a "DB" and a database management system as a "DBMS". A DB server is, for example, a server that executes a DBMS. An issuing source of a query to the DBMS may be a computer program (for example, an application program) outside of the DBMS. The external computer program may be a program executed in the DB server or may be a program executed in an apparatus (for example, a client computer) coupled to the DB server.

Furthermore, while an ID (for example, a number) is used as identification information of an element in the following description, other types of identification information may be used in place of, or in addition to, an ID.

In addition, in the following description, when describing elements of a same type without distinguishing the elements from one another, reference signs or a common number in reference signs will be used, but when describing elements of a same type by distinguishing the elements from one another, reference signs of the elements may be used or IDs assigned to the elements may be used in place of the reference signs of the elements.

Furthermore, in the following description, an I/O (Input/Output) request signifies a write request or a read request and may also be referred to as an access request.

In addition, while a "program" is sometimes used as a subject when describing a process in the following description, since a program causes a prescribed process to be performed by appropriately using a storage unit (such as a memory) and/or an interface device (such as a communication port) and the like when being executed by a processor (such as a CPU (Central Processing Unit)), a "processor" may be used instead as a subject of a process. A process described using a program as a subject may be considered a process performed by a processor or by an apparatus or a system including a processor. Furthermore, a processor may include a hardware circuit which performs a part of or all of processing. A program may be installed in an apparatus such as a computer from a program source. The program source may be, for example, a program distribution server or a storage medium that can be read by a computer. When the program source is a program distribution server, the program distribution server includes a processor (for example, a CPU) and a storage unit, and the storage unit may further store a distribution program and a program that is a distribution target. Furthermore, by having the processor of the program distribution server execute the distribution program, the processor of the program distribution server may distribute the program that is the distribution target to other computers. In addition, in the following description, two or more programs may be realized as one program or one program may be realized as two or more programs.

Embodiment 1

Figure 13:
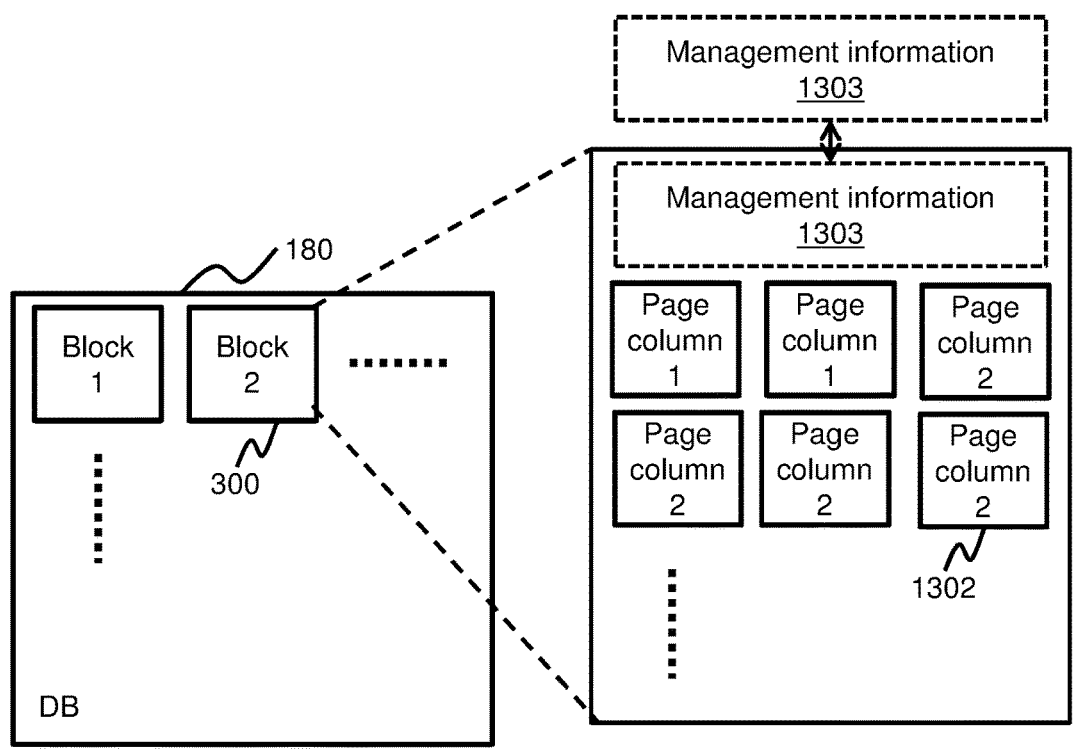
FIG. 13 shows an example of an outline of a DB configuration according to Embodiment 1.

FIG. 13 shows an example of an outline of a configuration of a DB 180 according to Embodiment 1.

For example, the DB 180 includes an index and a table, and at least the table in the DB 180 includes a plurality of data blocks 300. Each of the plurality of data blocks 300 includes a plurality of data pages 1302 storing a plurality of column values recorded in one or more records corresponding to the data block 300. Each of the plurality of data pages 1302 stores two or more column values in one column corresponding to the data page 1302.

When executing a query, a DB server (DBMS) selects a data block 300 from the plurality of data blocks 300 and specifies a data page 1302 that is a scan target from the selected data block 300.

The data block 300 corresponds to one or more records and retains all data necessary for the reconfiguration of one record. Therefore, the reconfiguration of a record is guaranteed. In addition, each data page 1302 in the data block 300 stores two or more column values in one column corresponding to the data page 1302, and the database server specifies a data page 1302 that is a scan target from the selected data block 300. Therefore, an increase in the speed of a record reconfiguration process (a reduction of a scan target area) can be realized. In other words, both guaranteeing record reconfiguration and increasing speed of a record reconfiguration process can be realized at the same time.

Such a DB configuration can be constructed by a DB server (DBMS). For example, a DB server (DBMS) divides the DB storage area into areas with a fixed size (the data pages 1302) and further gathers a plurality of data pages 1302 in consecutive areas to construct an area with a fixed size (the data block 300). When dividing a record into columns and storing the record in the DB 180, for each of one or more records, the DB server (DBMS) stores all column values constituting the single record into the same data block 300.

A comparative example described below is conceivable as another method of realizing both guaranteeing record reconfiguration and increasing the speed of a record reconfiguration process. Specifically, each minipage in the PAX page described earlier is divided into areas with a fixed size (hereinafter, segments). Each minipage is associated with management information (for example, the position index described earlier) including information representing a correspondence between a segment and its position. A PAX page corresponds to a specific record, and referring to a position index conceivably enables a segment that is a scan target to be specified. Therefore, according to the comparative example, both guaranteeing record reconfiguration and increasing speed of a record reconfiguration process can conceivably be realized.

However, a size of a column value differs depending on the column (data item). For example, sizes differ between a column value indicating an ID with four digits or so and a column value indicating an address of a residence of a person. Therefore, in the comparative example, there is a possibility that a free area may be created for each minipage area. In other words, capacity efficiency is conceivably low. Conceivably, this problem is particularly exacerbated when compression is performed in units of two or more column values. This is because compression ratios differ depending on contents of column values and on compression systems.

According to the present embodiment, as shown in FIG. 13, since the data pages 1302 are consecutive in the data block 300, problems similar to that of the comparative example are unlikely to occur. Moreover, in the present embodiment, the number of data pages corresponding to a column differs from column to column (in the example shown in FIG. 13, although two data pages correspond to a column 1, four data pages correspond to a column 2). This is because, as described above, although a size of a data page is fixed, column values differ depending on the column. In addition, when compression is adopted with respect to at least one column, a size of a column value after the compression differs depending on a compression system including whether compression is enabled or disabled.

When the technique according to the comparative example is adopted in a system handling large-scale data, a unit area is a segment obtained by further dividing an area (a minipage) obtained by dividing a page and, accordingly, there is a possibility that a total size of management information may end up being considerably large. Therefore, there is a risk that I/O performance (for example, read performance) may decline significantly. Specifically, for example, in a system handling small-scale data, a total size of management information is small and, consequently, management information of all minipages can conceivably be stored on a main storage memory. However, with a system handling large-scale data measurable in units of petabytes or exabytes, a total size of management information increases in units of terabytes or petabytes and management information of all minipages cannot conceivably be stored on a main storage memory. In addition, although specification of a minipage offset may conceivably be adopted in place of specification of a segment in the technique according to the comparative example in order to eliminate the occurrence of a free area in each page, this further increases the size of management information. In these cases, management information of at least a part of the minipages must be stored in an external storage apparatus. Therefore, every time a reference to the management information occurs, a read request for the management information may have to be issued to the external storage apparatus. As a result, a data read latency is created and processing time increases.

In the present embodiment, management information 1303 is associated with each of the plurality of data blocks 300. The management information 1303 includes directory information. The directory information represents, for each of the plurality of data pages 1302 included in the data block 300 corresponding to the management information 1303 including the directory information, an ID of a column corresponding to the data page 1302, and an ID of one or more records in which two or more column values on the data page 1302 is recorded. The DB server (DBMS) refers to the management information 1303 corresponding to the selected data block 300 and specifies the data page 1302 that is a scan target.

The management information 1303 may include information (for example, header information) other than directory information. For each of one or more data blocks 300, at least a part of the management information 1303 may be included in the data block 300. For example, all of the management information 1303 may be included in the data block 300 corresponding to the management information 1303. Accordingly, by reading the data block 300 from a data source (for example, an external storage apparatus) to the main storage memory, the management information 1303 is stored in the main storage memory (for example, a work area) together with the plurality of data pages 1302 in the data block 300. Moreover, as illustrated in FIG. 13, at least a part of (for example, all of) the management information 1303 may exist outside of the data block 300.

Compressed data which is data obtained by compressing two or more column values may be stored in each of one or more data pages 1302 in each of one or more data blocks 300. In each of the one or more data blocks 300, the management information 1303 associated with the data block 300 may include information representing a compression system with respect to each data page 1302 in the data block 300. In the management information 1303, the information representing a compression system may be included in directory information, header information, or other information. By referring to the management information 1303 corresponding to the selected data block 300, the DB server (DBMS) can specify the data page 1302 that is a scan target and specify a compression system corresponding to the data page 1302. The DB server (DBMS) can process (for example, decompress) data in the data page 1302 that is the scan target in accordance with the specified compression system. For example, the compression system may represent whether compression is enabled or disabled and, when compression is enabled, a compression method (for example, a compression algorithm).

Hereinafter, Embodiment 1 will be described in detail.

FIG. 1 shows a configuration example of a computer system according to Embodiment 1.

A DB server 100 is coupled to an external storage apparatus 402 via a communication network 403. As a communication protocol via the communication network 403, for example, FC (Fibre Channel), SCSI (Small Computer System Interface), or TCP/IP (Transmission Control Protocol/Internet Protocol) may be adopted.

The DB server 100 is a computer such as a personal computer, a work station, a main frame, or a virtual computer (a virtual machine) constituted by any of these computers. The DB server 100 includes a network adapter 155, a memory 105, a local storage device 165, and a processor (typically, a microprocessor) 160 coupled to these elements. The processor 160 executes computer programs including, for example, an OS (Operating System) 145, a DBMS 412, and an AP (Application Program) 110 that issues queries to the DBMS 412. The memory 105 is an example of a main storage memory and temporarily stores a program to be executed by the processor 160 and data used by the program. The local storage device 165 stores a program and data used by the program. The network adapter 155 couples the communication network 403 and the DB server 100 with each other. The AP 110 may run on another computer which is not shown coupled to the communication network 403 instead of the DB server 100.

Moreover, from the perspectives of performance and redundancy, the DB server 100 may include at least one of the processor 160, the memory 105, the local storage device 165, and the network adapter 155 in plurality. In addition, the DB server 100 may include an input device which is not shown (for example, a keyboard and a pointing device) and a display device which is not shown (for example, a liquid crystal display). The input device and the display device may be integrated.

In the DB server 100, the DBMS 412 executes a query issued from the AP 110 and, with the execution of the query, issues an I/O request with respect to the DB 180 stored in the external storage apparatus 402 to the OS 145. The OS 145 transmits the I/O request issued from the DBMS 412 to the external storage apparatus 402.

While the external storage apparatus 402 in the present embodiment is an apparatus having a storage device group 175 including a plurality of storage devices such as a disk array apparatus, alternatively, the external storage apparatus 402 may be a single storage device. The external storage apparatus 402 stores data and programs used by the DB server 100. The external storage apparatus 402 is an example of a secondary storage apparatus (a second storage device) with respect to the DB server 100. The external storage apparatus 402 receives the I/O request from the DB server 100, executes a process corresponding to the I/O request, and transmits a processing result to the DB server 100.

The external storage apparatus 402 includes a network adapter 171, the storage device group 175, and a controller 172 coupled to these elements.

The network adapter 171 couples the external storage apparatus 402 to the communication network 403.

The storage device group 175 includes one or more storage devices.

The storage device is a non-volatile storage medium of which examples include a magnetic disk, a flash memory, and other semiconductor memories. The storage device group 175 may be a group that stores data at a prescribed RAID level in accordance with RAID (Redundant Array of Independent Disks). The DB server 100 may be provided with a logical storage device (a logical volume) based on a storage space of the storage device group 175. The storage device group 175 stores the DB 180.

The controller 172 includes, for example, a memory and a processor, and inputs/outputs data to/from the storage device group 175 storing the DB 180 in accordance with an I/O request from the DB server 100. For example, the controller 172 stores data that is a write target in accordance with a write request from the DB server 100 in the storage device group 175 or reads data that is a read target in accordance with a read request from the DB server 100 from the storage device group 175 and transmits the read data to the DB server 100.

Moreover, from the perspectives of performance and ensuring redundancy, the external storage apparatus 402 may include elements such as the controller 172 in plurality.

The DBMS 412 manages the DB 180 containing business data. The DB 180 includes one or more tables 182 and may further include one or more indices. The table 182 is a set of one or more rows (records), and a record is constituted by one or more columns. At least the table 182 may be constituted by a plurality of data blocks 300. The index 181 is a data structure generated with one or more columns in the table 182 as a target and is intended to speed up access to the table 182 using selection conditions including a column targeted by the index 181 or the like. For example, the index 181 is a data structure that retains, for each column value of a target column, information for specifying a record including the column value in the table 182. As the data structure, for example, a B-tree or the like is used. A physical address, a logical row ID, and the like may be used as information for specifying a record.

The DBMS 412 includes a query accepting unit 120, a query execution plan generating unit 125, a data loading unit 130, a query executing unit 135, and a DB buffer management unit 140.

The query accepting unit 120 accepts a query issued by a query issuing source such as the AP 110. The query is described by, for example, SQL (Structured Query Language).

With respect to the query accepted by the query accepting unit 120, the query execution plan generating unit 125 generates a query execution plan having one or more DB operations necessary for executing the query. For example, the query execution plan is information that defines an execution order of DB operations to be performed when executing a query in a tree structure and is stored in the memory 105.

The data loading unit 130 constructs the DB 180 including the plurality of data blocks 300 described earlier. The data loading unit 130 has a directory information generating unit 131, and the directory information generating unit 131 generates at least directory information in the management information 1303.

The query executing unit 135 executes the query accepted by the query accepting unit 120 and returns an execution result to the query issuing source. Specifically, for example, in accordance with a query execution plan generated by the query execution plan generating unit 125, the query executing unit 135 executes a DB operation that is information included in the query execution plan. In doing so, the query executing unit 135 can generate (for example, dynamically generate) and execute a task for executing the DB operation. As the task, an arbitrary module can be adopted. For example, the task may be a process or a thread managed by the OS 145 or a pseudo process or a pseudo thread implemented by the DBMS 412. The query executing unit 135 includes a directory information acquiring unit 136 which acquires directory information and a data page acquiring unit 137 which acquires the data page 1302.

The DB buffer management unit 140 manages one or more storage areas (buffer areas) for temporarily storing a page in the DB 180. The DB buffer management unit 140 controls reservation and release of buffer areas.

The configuration of the DBMS 412 shown in FIG. 1 is merely an example. For example, a certain component may be divided into a plurality of components and a plurality of components may be integrated into a single component.

FIG. 2 shows an example of the table 182 stored in the DBMS 412.

Figure 3:
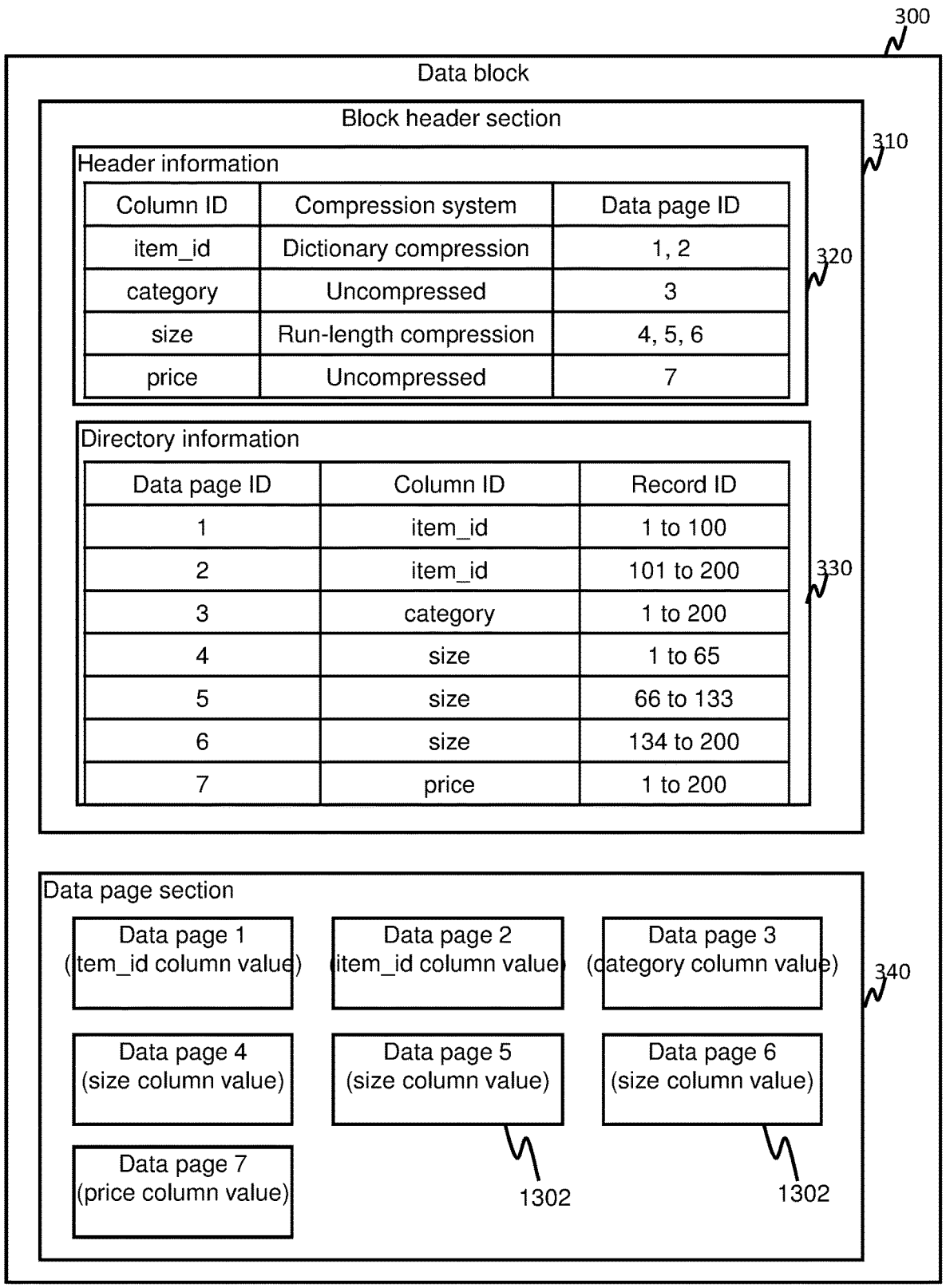
FIG. 3 shows an example of a data block according to Embodiment 1.

The example of the table 182 illustrated in FIG. 2 is an item table 201 constituted by four columns (data items) including item_id, category, size, and price. The item table 201 is divided into record sets made up of one or more rows (records), and each record set is stored in the data block 300 with a fixed size. The table 182 in FIG. 2 is a logical configuration, and the table 201 in FIG. 2 is divided and stored in a plurality of the data blocks 300 described above. FIG. 3 shows an example of the data block 300 in which a part of the table 201 in FIG. 2 is stored.

FIG. 3 shows an example of the data block 300.

The data block 300 includes a block header section 310 and a data page section 340. The block header section 310 is an example of the management information 1303 associated with the data block 300 and, specifically, for example, includes header information 320 and directory information 330.

The header information 320 represents a correspondence among a column, a compression system of column values in the column, and the data page 1302 storing the column values in the column. Specifically, for example, the header information 320 includes an entry for each column. Information stored in each entry includes an ID of a column, a compression system of column values in the column, and IDs of one or more data pages 1302 storing all of the column values in the column.

The directory information 330 represents a correspondence among the data page 1302, a column, and a record. Specifically, for example, the directory information 330 includes an entry for each of the plurality of data pages 1302 in the data block 300 with which the directory information 330 is associated. Information stored in each entry includes an ID of a data page 1302, a column corresponding to the data page 1302, and an ID of a record including a column value stored in the data page 1302.

The data page section 340 is constituted by a plurality of data pages 1302, and the plurality of data pages 1302 store all of the column values stored in a record set (one or more records) corresponding to the data block 300. However, each data page 1302 stores column values in a single column and does not store column values in other columns.

FIG. 4 shows an example of a query.

An example of a query accepted in relation to the table 201 in FIG. 2 is a query described by SQL such as that shown in FIG. 4.

FIG. 5 shows an example of intermediate data.

When the query executing unit 135 executes a query, the query executing unit 135 can generate and output intermediate data for each column specified by the query with respect to the data page 1302 that is a scan target. An example of intermediate data is a condition evaluation bit string 501 shown in FIG. 5 (FIG. 5 shows condition evaluation bit strings 501A to 501C respectively corresponding to conditions 1 to 3). For each column specified in a query, the condition evaluation bit string 501 represents bits respectively corresponding to column values in the column or, in other words, a so-called bitmap. Each bit takes a value in accordance with whether or not a column value corresponding to the bit conforms to the condition specified in the query. For example, each bit takes a value of "1" when the column value corresponding to the bit conforms to the condition specified in the query but takes a value of "0" when the column value corresponding to the bit does not conform to the condition specified in the query. By performing a projection process using the condition evaluation bit string 501 configured in this manner, an increase in speed of the projection process can be expected. Details will be described later.

Hereinafter, processes performed in the present embodiment will be described.

Figure 6:
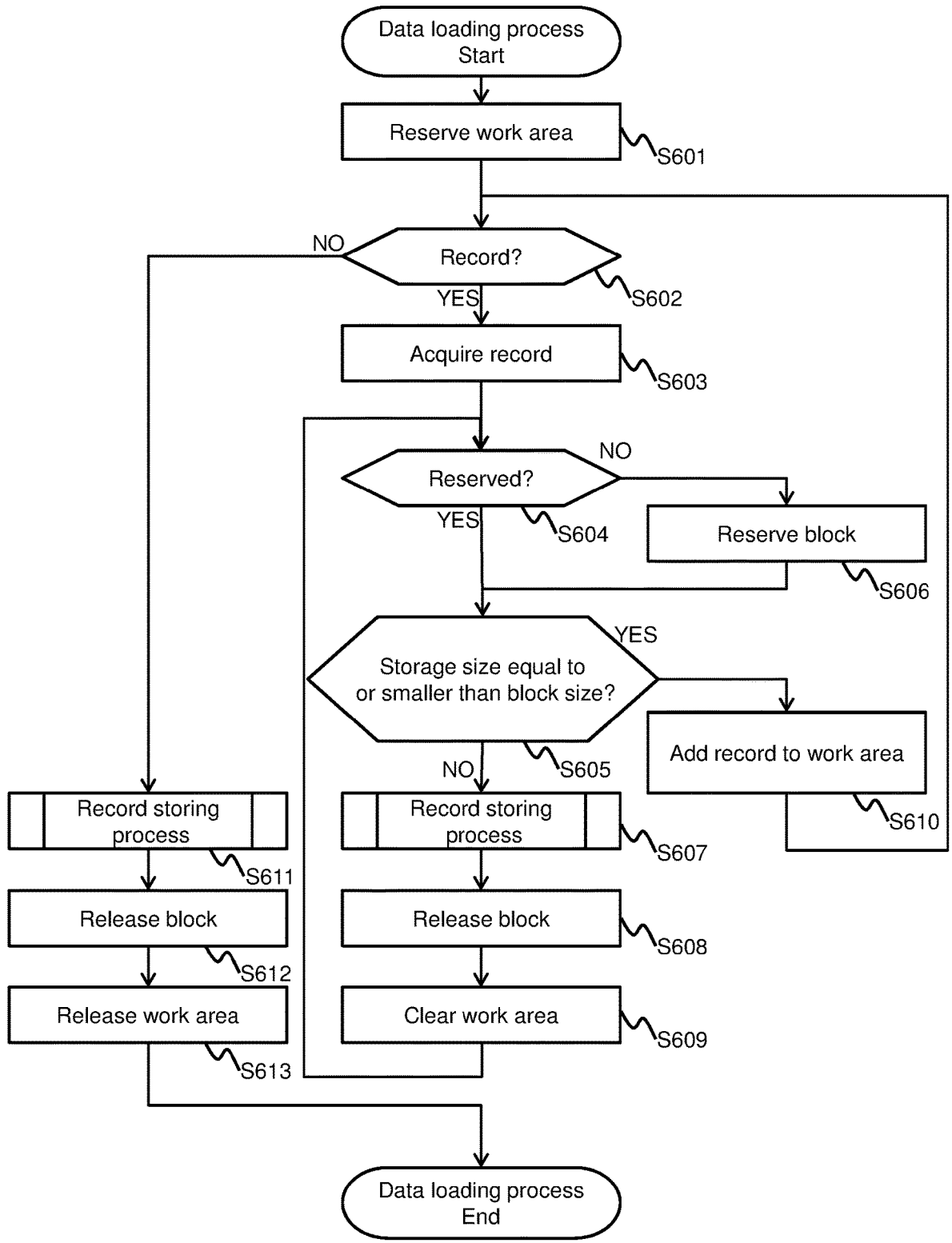
FIG. 6 shows an example of a flow of a data loading process according to Embodiment 1.

FIG. 6 shows an example of a flow of a data loading process.

The data loading unit 130 accepts a data loading request and, in response to the request, performs a data loading process (an input data storing process). A request source of the data loading request may be, for example, a client computer (user) of the DB server 100 or a management system (not shown) (manager) of the DB server 100.

(S601) When the data loading process is started, the data loading unit 130 calls the DB buffer management unit 140 to secure (alternatively, the data loading unit 130 itself secures) a work area from the memory 105.

(S602) The data loading unit 130 determines whether or not there remains a storage target record. When a result of the determination is positive, S603 is executed, but when the result of the determination is negative, S611 is executed.

(S603) The data loading unit 130 acquires the storage target records from the external storage apparatus 402. However, at this stage, the storage target records are stored in a temporary area outside of the work area and are not stored in the work area.

(S604) The data loading unit 130 determines whether or not a storage destination data block 300 has already been reserved. When a result of the determination is positive, S605 is executed, but when the result of the determination is negative, S606 is executed.

(S606) The data loading unit 130 reserves the storage destination data block 300. The reserved data block 300 is an empty data block 300.

(S605) The data loading unit 130 calculates a stored data size (an expected size of data after storage) when the storage target records (the storage target records in the temporary area) acquired in immediately-preceding S603 and the records in the work area are converted into a storage format, and determines whether or not the calculated stored data size is equal to or smaller than a size of the storage destination data block 300. When a result of the determination is positive, S610 is executed, but when the result of the determination is negative, S607 is executed.

(S610) The data loading unit 130 adds the storage target records acquired in S603 to the work area. Subsequently, S602 is executed once again.

(S607) The data loading unit 130 executes a record storing process (FIG. 7) which is a process of storing a record set stored in the work area to the data block 300.

(S608) The data loading unit 130 releases the storage destination data block 300.

(S609) The data loading unit 130 executes clearing of the work area (for example, deletion of the record set in the work area). Subsequently, S604 is executed once again.

(S611) The data loading unit 130 performs the record storing process (FIG. 7) described above.

(S612) The data loading unit 130 releases the storage destination data block 300.

(S613) The data loading unit 130 releases the work area. Accordingly, the process is finished.

Due to the data loading process, for example, the following is performed. Specifically, when executing data loading of the item table 201, the data loading unit 130 reserves a work area (S601), and stores column values of "item_id", "category", "size", and "price" of the storage target records into the reserved work area (S610). In doing so, the data loading unit 130 calculates a stored data size when the storage target records and the records already stored in the work area are converted into a storage format, and determines whether or not the stored data size is equal to or smaller than the size of the data block 300 (S605). When a result of the determination of S605 is negative, the data loading unit 130 executes a record storing process of storing a record set in the work area into the data block 300 (S607), and clears the work area (S609). Moreover, while "clearing the work area" means that, for example, the work area is emptied, the work area is still being reserved. "Releasing the work area" is performed in order to release the reservation of the work area.

Figure 7:
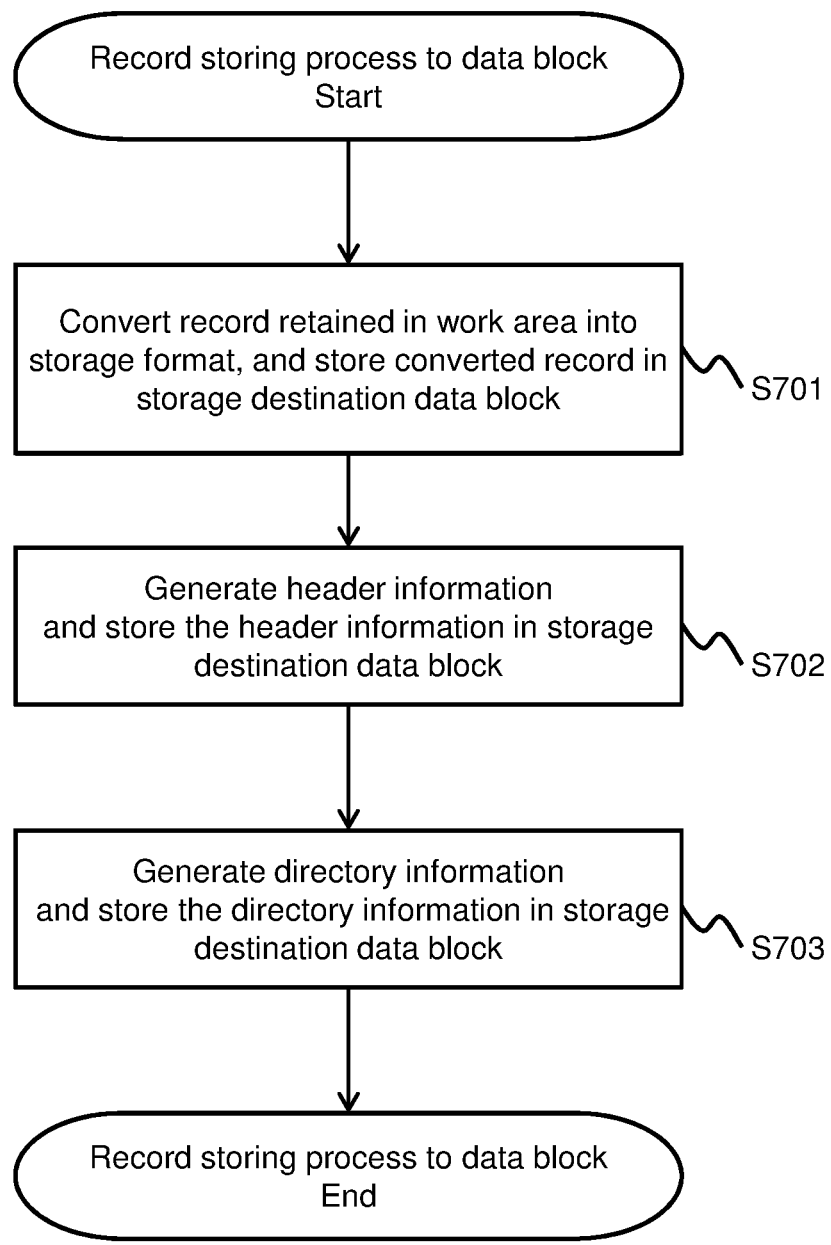
FIG. 7 shows an example of a flow of a record storing process according to Embodiment 1.

FIG. 7 shows an example of a flow of a record storing process.

(S701) The data loading unit 130 converts the record set retained in the work area into a storage format and stores the converted record set in the storage destination data block 300. Accordingly, the plurality of column values in the record set are stored in a plurality of data pages 1302.

(S702) The data loading unit 130 generates header information 320 and stores the header information 320 in the storage destination data block 300. For example, the data loading unit 130 generates the header information 320 including an entry for each column in the record set. The data loading unit 130 registers, in each entry, an ID of a column, a compression system, and an ID of each of one or more data pages 1302 in which column values corresponding to the column are stored. The header information 320 with information registered in each entry is stored in the storage destination data block 300.

(S703) The data loading unit 130 (the directory information generating unit 131) generates directory information 330 and stores the directory information 330 in the storage destination data block 300. For example, the data loading unit 130 (the directory information generating unit 131) generates the directory information 330 including an entry for each page in the storage destination data block 300. The data loading unit 130 (the directory information generating unit 131) registers, in each entry, an ID of the data page 1302, an ID of a column, and an ID of each of one or more records having column values stored in the data page 1302 (for example, a beginning and an end of one or more record IDs respectively corresponding to one or more data pages 1302). The directory information 330 with information registered in each entry is stored in the storage destination data block 300.

Due to the record storing process, for example, the following is performed. The data loading unit 130 converts records stored in the work area into a storage format and stores the converted records in the data page section 340 of the data block 300 (S701). The data loading unit 130 generates header information 320 and stores the header information 320 in the storage destination data block 300 (S702). The example of the header information 320 shown in FIG. 3 indicates that column values of item_id are compressed in a dictionary compression system and stored in data pages 1 and 2. The directory information generating unit 131 generates directory information 330 and stores the directory information 330 in the storage destination data block 300 (S703). The example of the directory information 330 shown in FIG. 3 indicates that column values of item_id of record IDs 1 to 100 are stored in the data page 1.

Next, a flow of a query executing process will be described.

The query accepting unit 120 accepts a query issued by a query issuing source such as a client computer. For example, the query accepting unit 120 accepts the query shown in FIG. 4. Based on the query, the query execution plan generating unit 125 generates a query execution plan. When executing the query, the query executing unit 135 acquires the header information 320 and acquires the directory information 330 by the directory information acquiring unit 136. Using the acquired header information 320 and the directory information 330, the query executing unit 135 acquires a processing target data page 1302 by the data page acquiring unit 137.

Figure 8:
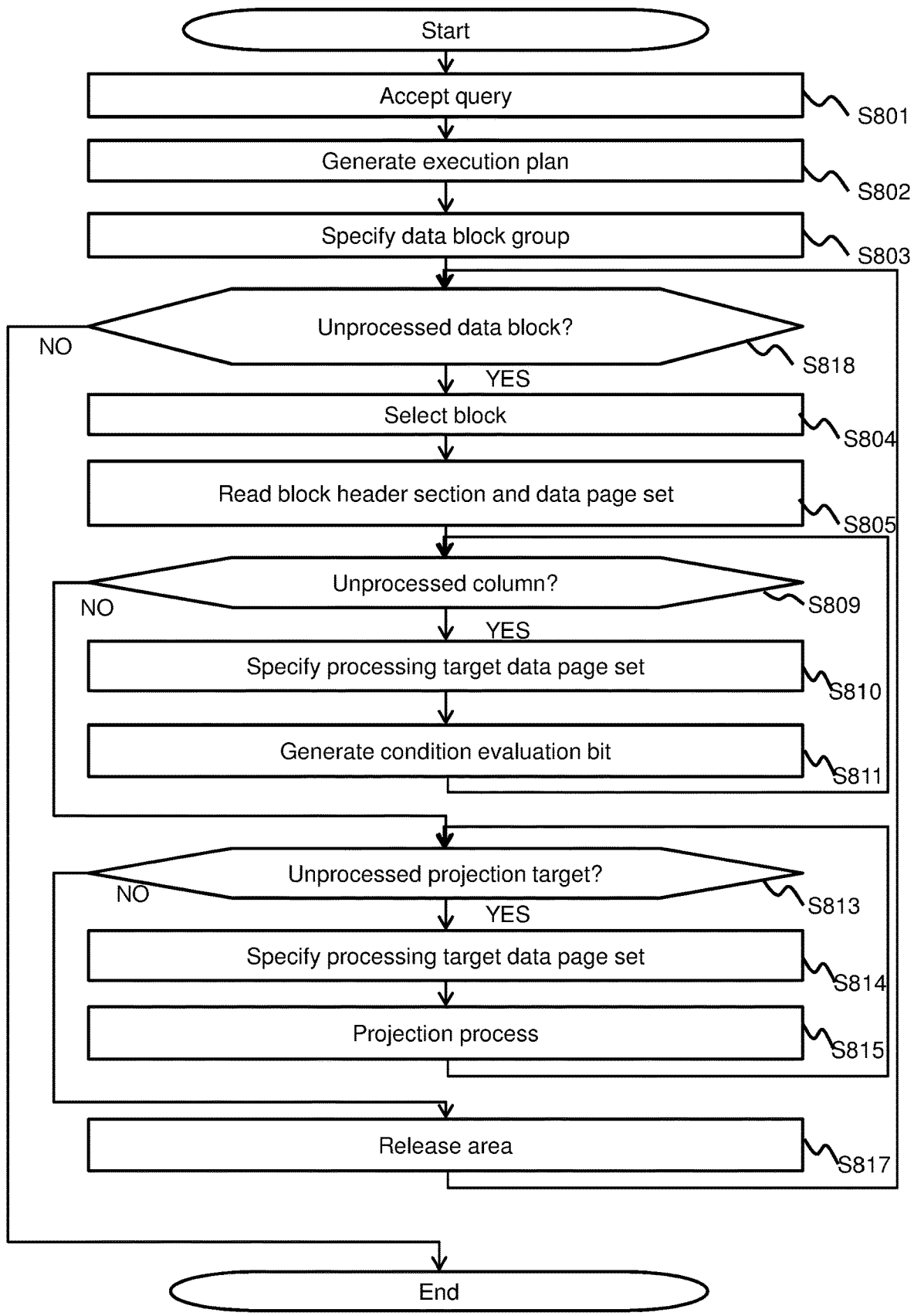
FIG. 8 shows an example of a flow of a query executing process according to Embodiment 1.

FIG. 8 shows an example of a flow of the query executing process.

(S801) The query accepting unit 120 accepts a query from a query issuing source.

(S802) Based on the query, the query execution plan generating unit 125 generates a query execution plan.

(S803) Based on the generated query execution plan, the query executing unit 135 specifies a data block group that is a search processing target. At this point, for example, an entire block of a certain table (for example, an item table) is read.

(S818) The query executing unit 135 determines whether or not an unprocessed data block 300 exists in the processing target data block group. When a result of the determination is negative, the process is ended. When a result of the determination is positive, S804 is executed.

(S804) The query executing unit 135 selects an unprocessed data block 300 from the data block group that is the search processing target.

(S805) The query executing unit 135 calls the DB buffer management unit 140, and the DB buffer management unit 140 reserves a buffer area and reads the block header section 310 in the data block 300 selected in S804 and a data page set storing a processing target column. The data page set may be read in units of data blocks 300 or only the block header section 310 may be read and a data page set specified from the block header section 310 may be read.

(S809) The query executing unit 135 determines whether or not there remains an unprocessed processing target column. When a result of the determination is negative, S813 is executed, but when the result of the determination is positive, S810 is executed.

(S810) The query executing unit 135 acquires the header information 320 of the block header section 310 from, for example, the buffer area to the work area. The directory information acquiring unit 136 acquires the directory information 330 from the block header section 310 in the data block 300. The query executing unit 135 specifies a data page set that is a processing target using the acquired header information 320 and directory information 330.

(S811) The data page acquiring unit 137 acquires the specified data page set from, for example, the buffer area to the work area. The query executing unit 135 performs a condition evaluation for each data page 1302 included in the acquired data page set, and generates a condition evaluation bit string 501 (an example of intermediate data) as a result of the condition evaluation.

(S813) The query executing unit 135 determines whether or not there remains an unprocessed projection target column. When a result of the determination is negative, S817 is executed, but when the result of the determination is positive, S814 is executed.

(S814) The query executing unit 135 acquires the header information 320 of the block header section 310. The directory information acquiring unit 136 acquires the directory information 330 from the block header section 310 in the data block 300. The query executing unit 135 specifies a data page set that is a processing target using the acquired header information 320 and directory information 330.

(S815) The data page acquiring unit 137 acquires the specified data page set. While referring to the generated condition evaluation bit string 501, the query executing unit 135 performs a projection process of column values included in the acquired data page set with respect to records of which a result of the condition evaluation is TRUE (records having column values corresponding to bit "1").

(S817) The query executing unit 135 releases an area used for the read process in the processing of the data block.

Due to the query executing process, for example, the following is performed.

The query accepting unit 120 accepts a query (S801), and the query execution plan generating unit 125 generates an execution plan of a scan system of the table 182 (S802). The query executing unit 135 refers to the execution plan and acquires the table 182 that is an access target, and specifies a data block group storing the table 182 (S803).

When there is an unprocessed data block 300 (S818), the query executing unit 135 selects the unprocessed data block 300 from the data block group (S804). The DB buffer management unit 140 reads the block header section 310 in the data block 300 and a data page set storing a processing target column (S805). At this point, the entire data block 300 including the block header section 310 and the data page 1302 storing the processing target column may be read. Alternatively, a data reading process may be divided into two phases. In a first phase, only the block header section 310 may be read and a necessary data page 1302 may be specified by referring to the block header section 310. In a second phase, only the necessary data page 1302 may be read. A search query illustrated in FIG. 4 shows that there are three conditions: "category=10"; "price>=200"; and "size=L". The example shown in FIG. 3 shows that the data page 1302 storing the "category" column is data page 3 (the data page 1302 with an ID "3"), data is stored uncompressed in data page 3, the data page 1302 storing the "price" column is data page 7, data is stored uncompressed in data page 7, the data pages 1302 storing the "size" column are data pages 4, 5, and 6, and data compressed in the compression system "run-length" are stored in data pages 4 to 6. In addition, the search query illustrated in FIG. 4 shows that, according to the example in FIG. 3 with a projection of "item_id", the data pages 1302 with a projection target column are data pages 1 and 2, and data compressed in the compression system "dictionary compression" is stored in data pages 1 and 2.

The query executing unit 135 determines whether or not there remains an unprocessed condition evaluation target column (S809). When a result of the determination is positive, the directory information acquiring unit 136 acquires the directory information 330 from the block header section 310 in the data block 300 and specifies a data page set that is a processing target (S810). The data page acquiring unit 137 acquires data pages 3 to 7 which are the specified data page set. The query executing unit 135 performs a condition evaluation on data included in the acquired data page set and, with respect to the condition evaluation target columns, respectively generates the condition evaluation bit strings 501A to 501C illustrated in FIG. 5 as intermediate data (S811). FIG. 5 shows examples of the condition evaluation bit string in the query execution shown in FIG. 4. When evaluating "category=10" with respect to the first to eighth records in the item table 201, since the fourth to sixth from top records in the table 182 satisfy this condition, fourth to sixth bits from left are 1 and the other bits are 0 in the condition evaluation bit string 501A shown in FIG. 5.

Once all condition evaluations are completed, the query executing unit 135 performs a projection process. Moreover, when results of condition evaluations of all records are FALSE upon the conclusion of the condition evaluations, the subsequent projection process may be omitted. The query executing unit 135 determines whether or not there remains an unprocessed projection target column (S813). When a result of the determination is positive, the query executing unit 135 acquires the header information 320 of the block header section 310, and the directory information acquiring unit 136 acquires the directory information 330 from the block header section 310 in the data block 300. The query executing unit 135 specifies a data page set that is a processing target using the acquired header information 320 and directory information 330 (S814). The data page acquiring unit 137 acquires the specified data page set, and while referring to the generated condition evaluation bit string 501, the query executing unit 135 performs a projection process of column values included in the acquired data page set with respect to records of which a result of the condition evaluation is TRUE (S815). Since a record that is a projection target must satisfy all three conditions, bits of the condition evaluation bit string 501 corresponding to the record are all 1. In other words, the fifth and sixth among the first to eighth bits are 1.

When all projection processes in one block are completed, the query executing unit 135 releases an area used for the read process in the data block 300 (S817).

Next, an example of a flow of the query executing process when the query execution plan generating unit 125 selects an index search as a query execution plan will be described with reference to FIG. 11.

Figure 11:
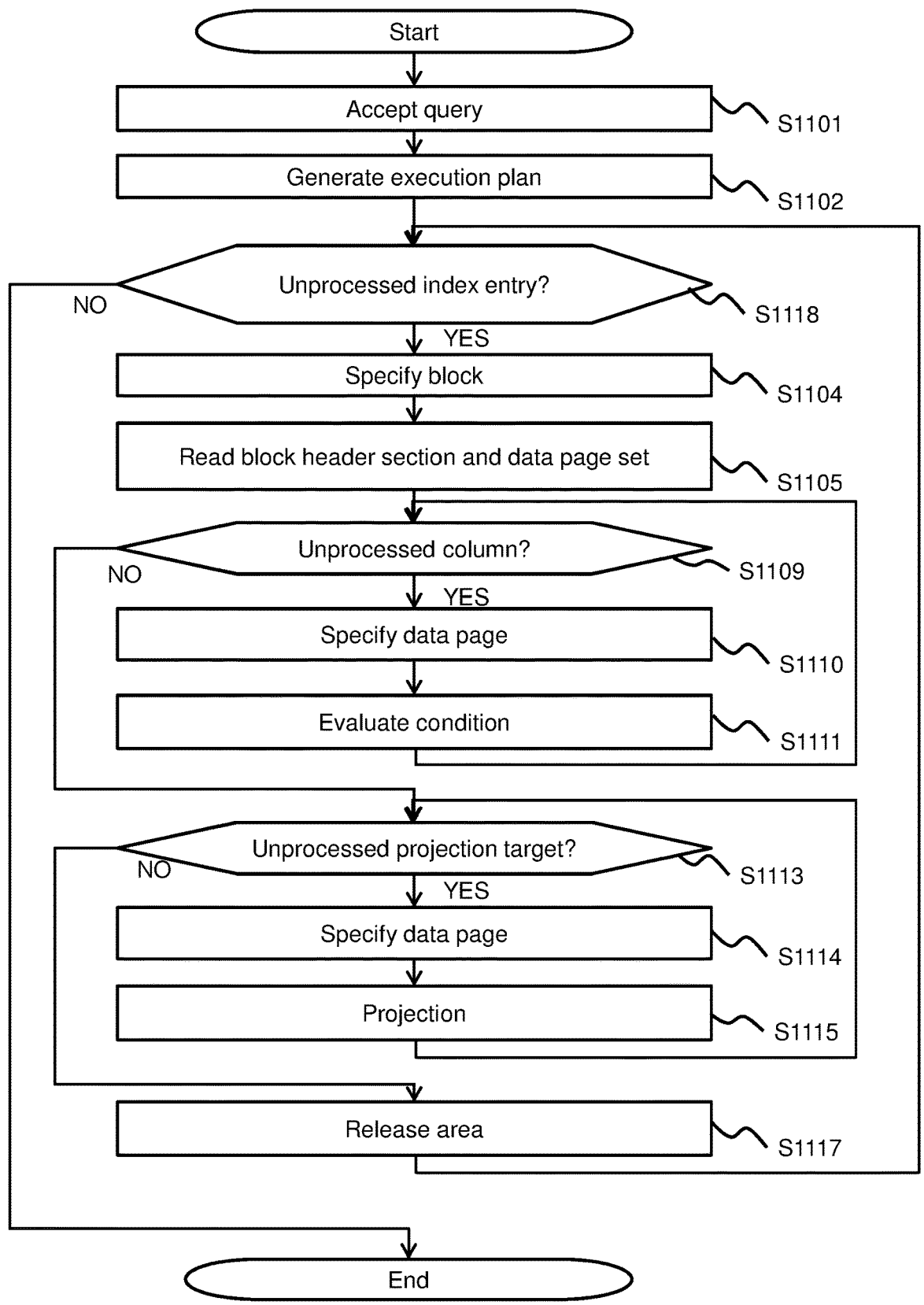
FIG. 11 shows another example of a flow of a query executing process according to Embodiment 1.

FIG. 11 shows another example of a flow of the query executing process. Moreover, in the description of FIG. 11, points in common with the description of FIG. 8 will be either omitted or simplified.

(S1101) The query accepting unit 120 accepts a query from a query issuing source.

(S1102) The query execution plan generating unit 125 generates an execution plan.

(S1118) Based on the generated execution plan, the query executing unit 135 performs an index search process and determines whether or not there remains an unprocessed index entry. When a result of the determination is positive, an unprocessed index entry is selected and S1104 is executed. When the result of the determination is negative, the index process is ended.

(S1104) The query executing unit 135 refers to the selected index entry and specifies the data block 300 storing a processing target record.

(S1105) The query executing unit 135 calls the DB buffer management unit 140, and the DB buffer management unit 140 reads the block header section 310 in the data block 300 and a data page set storing a processing target column.

(S1109) The query executing unit 135 determines whether or not there remains an unprocessed condition evaluation target column. When a result of the determination is positive, S1110 is executed, but when the result of the determination is negative, S1113 is executed.

(S1110) The query executing unit 135 acquires the header information 320 of the block header section 310. The directory information acquiring unit 136 acquires the directory information 330 from the block header section 310 in the data block 300. The query executing unit 135 specifies the data page 1302 that is a processing target using the acquired header information 320 and directory information 330.

(S1111) The data page acquiring unit 137 acquires the specified data page 1302, and the query executing unit 135 performs a condition evaluation on column values of the processing target record stored in the acquired data page 1302.

(S1113) The query executing unit 135 determines whether or not there remains an unprocessed projection target column. When a result of the determination is positive, S1114 is executed, but when the result of the determination is negative, S1117 is executed.

(S1114) The query executing unit 135 acquires the header information 320 of the block header section 310. The directory information acquiring unit 136 acquires the directory information 330 from the block header section 310 in the data block 300. The query executing unit 135 specifies the data page 1302 that is a processing target using the acquired header information 320 and directory information 330.

(S1115) The data page acquiring unit 137 acquires the specified data page 1302. When a result of the condition evaluation is TRUE, the query executing unit 135 performs a projection process on the column values of the processing target record stored in the acquired data page 1302.

(S1117) The query executing unit 135 releases an area used for the read process in the processing of the data block 300.

Figure 12:
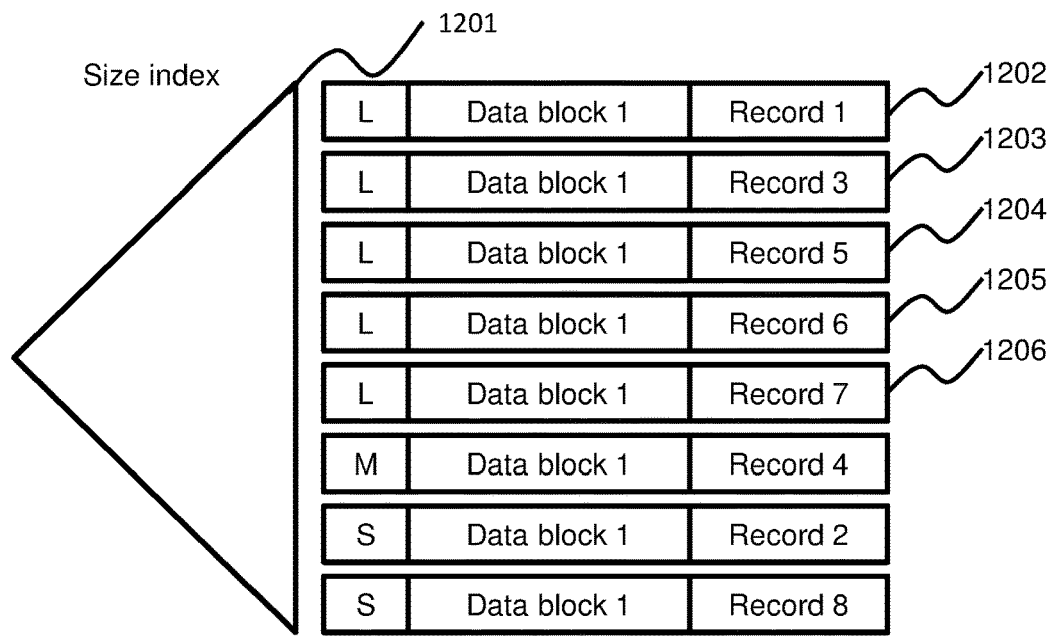
FIG. 12 shows an example of an index according to Embodiment 1.

FIG. 12 shows an example of a size index 1201 which is an example of the index 181. A leaf portion stores an index entry which is a set of a key value of the index 1201, a data block ID, and a record ID. In the example shown in FIG. 12, "L" as a key value of the index 181, "Data block 1" as a data block ID, and "Record 1" as a record ID are stored.

Due to the query executing process, for example, the following is performed.

Since the query includes a condition designation of "size=L", the query executing unit 135 searches for index entries satisfying size=L" in the size index 1201, and selects an index entry from five index entries 1202 to 1206 obtained as a result of the search. The query executing unit 135 refers to the selected index entry and specifies the data block 300 (for example, data block 1) storing a processing target record (S1104). Subsequently, the DB buffer management unit 140 reads the block header section 310 in the data block 300 and a data page set storing a processing target column (S1105).

When there remains an unprocessed condition evaluation target column (S1109), the query executing unit 135 specifies the data page 1302 that is a processing target using the header information 320 and the directory information 330 (S1110). The data page acquiring unit 137 acquires the specified data page 1302, and the query executing unit 135 performs a condition evaluation on column values of the processing target record stored in the acquired data page 1302 (S1111). When the processing target record is "record 1", a result with respect to the condition "category=10" is FALSE.

Once all condition evaluations are completed, the query executing unit 135 performs a projection process. When there remains an unprocessed projection target column, the query executing unit 135 specifies the data page 1302 that is a processing target using the header information 320 and the directory information 330 (S1114). When a result of the condition evaluation is TRUE, the query executing unit 135 performs a projection process on the column values of the processing target record stored in the acquired data page 1302 (S1115). Since the condition evaluation of the "record 1" results in FALSE with respect to the condition "category=10", a projection process is not performed. Since the condition evaluation of the "record 5" results in TRUE with respect to the condition "category=10" and TRUE with respect to the condition "price>=200", a column value "5" of item_id is projected.

Embodiment 2

Hereinafter, Embodiment 2 will be described. In doing so, differences from Embodiment 1 will be mainly described and descriptions of points in common with Embodiment 1 will be either omitted or simplified.

Figure 9:
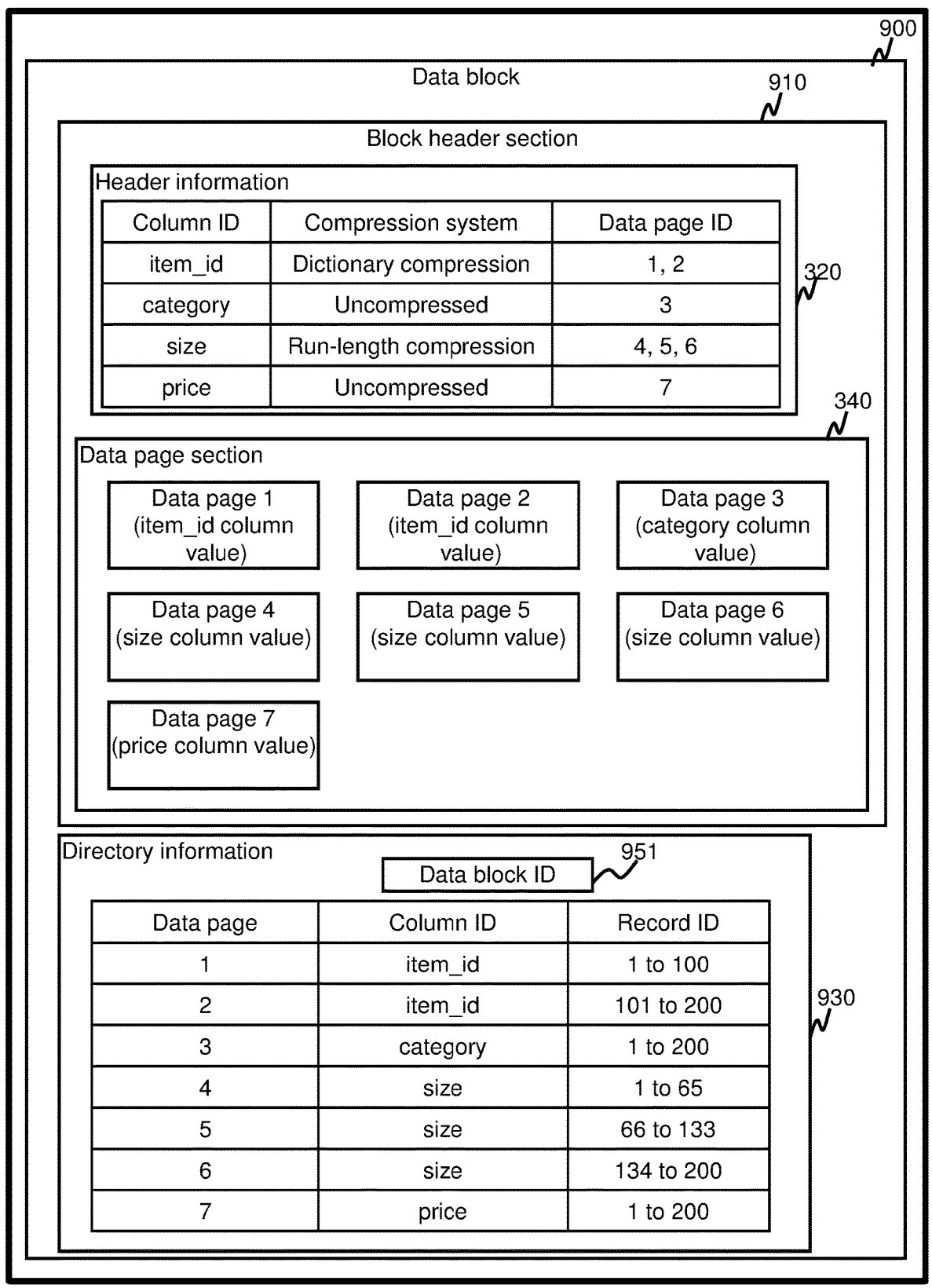
FIG. 9 shows an example of stored data according to Embodiment 2.

FIG. 9 shows an example of a data block and directory information according to Embodiment 2.

Differences from Embodiment 1 are that a block header section 910 of a data block 900 does not include directory information 930 and that the directory information 930 includes a data block ID 951. The data block ID 951 is an ID of the data block 900 associated with the directory information 930. By referring to the data block ID 951 in the directory information 930, the data block 900 associated with the directory information 930 can be specified.

In Embodiment 2, a plurality of pieces of directory information 930 respectively corresponding to a plurality of data blocks 900 are stored in consecutive areas (for example, consecutive areas in a storage space provided by the external storage apparatus 402). Accordingly, the plurality of pieces of directory information 930 can be read by a sequential read or, in other words, the plurality of pieces of directory information 930 can be read by one data read request. Compared to a case where the plurality of pieces of directory information 930 are sequentially read, a time required to read the directory information 930 can be reduced.

Moreover, in place of or in addition to the directory information 930, other information in management information such as the header information 320 may not be included in the data block 900. In other words, all of or a part of management information may exist outside the data block 900.

Embodiment 3

Hereinafter, Embodiment 3 will be described. In doing so, differences from Embodiment 1 will be mainly described and descriptions of points in common with Embodiment 1 will be either omitted or simplified (Alternatively, Embodiment 3 may be applied to Embodiment 2).

Figure 10:
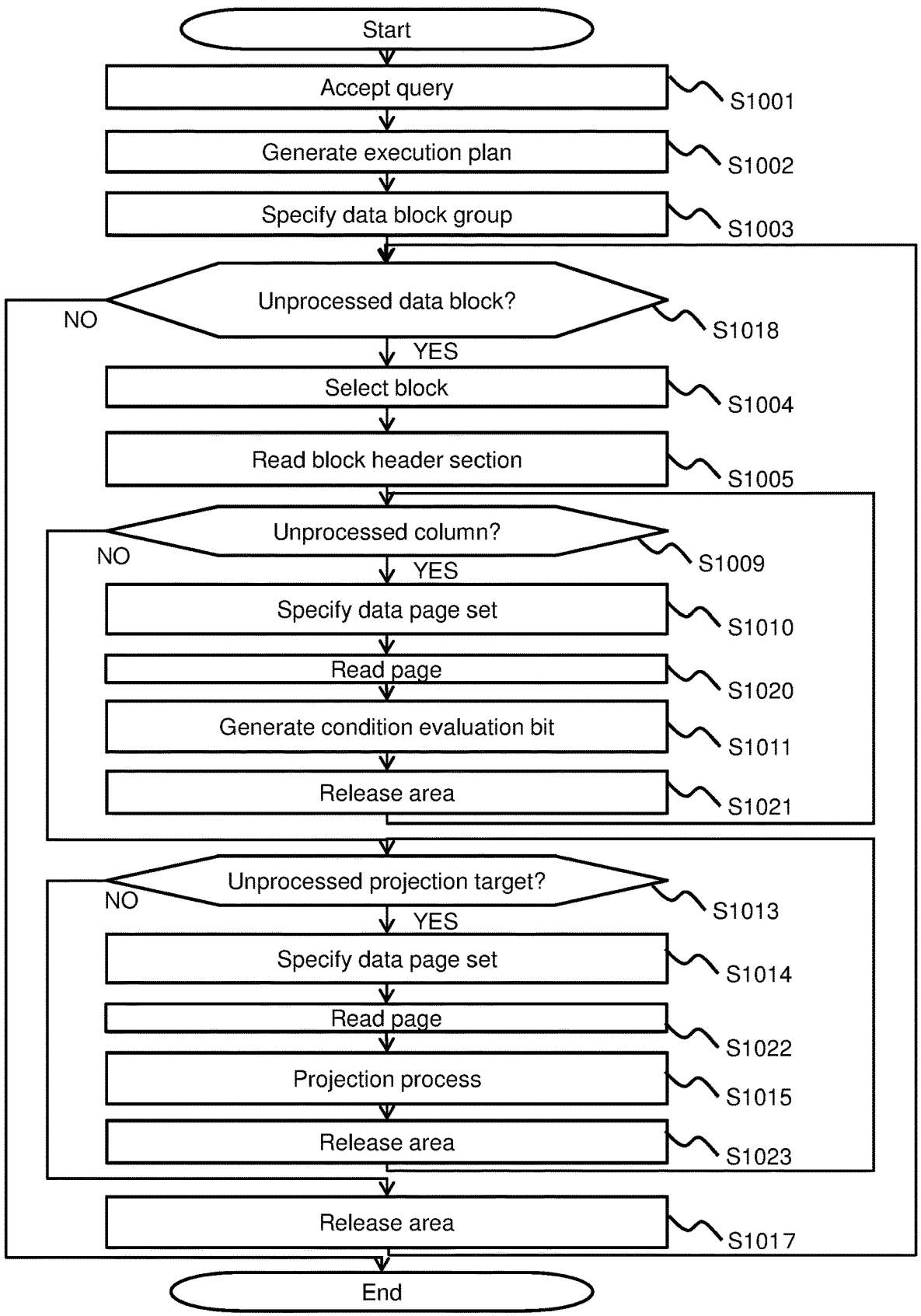
FIG. 10 shows an example of a flow of a query executing process according to Embodiment 3.

FIG. 10 shows an example of a flow of a query executing process according to Embodiment 3.

Differences from FIG. 8 include S1005 being performed in place of S805, and S1020, S1021, S1022, and S1023 being further performed. In addition, S1001, S1002, S1003, S1018, S1004, S1009, S1010, S1011, S1013, S1014, S1015, and S1017 in FIG. 10 are processes identical to (or substantially similar to) S801, S802, S803, S818, S804, S809, S810, S811, S813, S814, S815, and S817 in FIG. 8.

Specifically, after S1004, a query executing unit 135' reads only the block header section 310 in the data block 300 (S1005).

When executing a condition evaluation process, the query executing unit 135' acquires the header information 320 and the directory information 330 and specifies a data page set that is a processing target (S1010). Moreover, at this point, the query executing unit 135' may refer to a query and a condition evaluation result of a previous process, specify a record for which a condition evaluation process of a processing target can be omitted, specify a processing target record set from which the record has been deleted, and specify a processing target data page set storing the processing target record set. Subsequently, the query executing unit 135' reads the specified processing target data page 1302 (S1020), executes the condition evaluation process on the data page set, generates the condition evaluation bit string 501 (S1011), and releases an area used in the reading process in the condition evaluation process (S1021).

In a similar manner, when executing a projection process, the query executing unit 135' acquires the header information 320 and the directory information 330 and specifies a processing target data page set (S1014). Moreover, at this point, the query executing unit 135' may concurrently refer to a condition evaluation result, specify a record for which a projection process of a processing target can be omitted, specify a processing target record set from which the record has been deleted, and specify a processing target data page set storing the processing target record set. Subsequently, the query executing unit 135' reads the specified processing target data page 1302 (S1022), executes the projection process on the data page set (S1015), and releases an area used in the reading process in the projection process (S1023).

According to Embodiment 3, necessary pages are read to the main storage memory in accordance with the progress of the query executing process and the area is released after the process is completed. Therefore, a main storage memory area that must be simultaneously reserved can be reduced. In addition, since the processing target data page 1302 is specified in accordance with the progress of the query executing process, a read process of an unnecessary data page 1302 can be reduced.

While several embodiments have been described above, it is to be understood that the described embodiments merely represent examples for illustrating the present invention and that the scope of the present invention is not limited to the embodiments. The present invention can be implemented in various other modes. For example, the present invention may be applied to an in-memory database (specifically, for example, the DB 180 may be entirely stored in the memory 105 inside the DB server 100).

REFERENCE SIGNS LIST

100 DB (database) server

The invention claimed is:

1. A database management system, comprising:
a database having a plurality of records and a plurality of blocks;
at least one processor configured to execute at least one program to perform the steps of:
accepting a query; and
executing the query and issue, in executing the query, an I/O request to the database,
wherein each of the plurality of data blocks includes a plurality of data pages storing a plurality of column values, of columns, recorded in one or more records corresponding to the data block,
wherein each of the plurality of data pages stores two or more column values in one column corresponding to the data page,
wherein each of the plurality of data blocks has management information associated with the corresponding data block and the management information provides a relationship between the plurality of data pages in the data block and the columns and the one or more records,
wherein the at least one processor is further configured to execute the at least one program to further perform the steps of:
(A) selecting a data block from the plurality of data blocks; and
(B) specifying a data page, which is a scan target, from the data block selected in (A) by using the management information,
wherein the management information includes directory information,
wherein the directory information represents, for each of the plurality of data pages included in the data block corresponding to the management information including the directory information, an ID of a column corresponding to the data page, and an ID of one or more records in which two or more column values on the data page are recorded,
wherein the at least one processor is further configured to execute the at least one program to further perform the steps of, in (B), referring to the management information corresponding to the data block selected in (A) and specifying the data page that is the scan target,
wherein each of the plurality of data blocks includes at least a part of the management information corresponding to the data block,
wherein each of the plurality of data blocks includes all of the management information corresponding to the data block, and
wherein the at least one processor is further configured to execute the at least one program to further perform the steps of:
by issuing a read request of the data block selected in (A) to an external storage apparatus storing at least a part of the database, reading the selected data block from the external storage apparatus, and storing a plurality of data pages and management information in the read data block into a memory area, and
in (B), referring to the management information stored in the memory area and specify the data page, which is the scan target, from the plurality of data pages stored in the memory area.

2. The database management system according to claim 1, wherein
the at least one processor is further configured to execute the at least one program to further perform, for each of one or more data pages that are scan targets, sequentially the steps of:
reserving a memory area;
reading the data page to the reserved memory area; and
when processing of the data block is completed, releasing the reserved memory area.

3. The database management system according to claim 1, further comprising:
a data loading unit, wherein
a configuration of the database is a configuration constructed by the data loading unit, and
the data loading unit is configured to, for each data block which is to be a storage destination:
(P) determine one or more records; and
(Q) store each of a plurality of column values recorded in the one or more records determined in (P) in a data page corresponding to a column including the column value.

4. The database management system according to claim 1, wherein
the at least one processor is further configured to execute the at least one program to further perform the step of, in executing the query:
(C) with respect to the data page that is the scan target, generating and outputting intermediate data for each column specified in the query,
with respect to each column specified in the query, the intermediate data has values respectively corresponding to column values in the column, and
for each flag, a value corresponding to the flag is a value in accordance with whether or not there is conformance with respect to conditions specified in the query.

5. The database management system according to claim 3, wherein
the number of records determined in (P) is a maximum number among the numbers of records that can be stored in the data block that is the storage destination.

6. The database management system according to claim 3, wherein the data loading unit is configured to, in (Q), generate the management information to be associated with a data block that is a storage destination, the management information includes directory information, the directory information represents, for each of a plurality of data pages included in the data block corresponding to the management information including the directory information, an ID of a column corresponding to the data page, and an ID of one or more records in which two or more column values on the data page are recorded, and the query executing unit is configured to, in (B), refer to the management information corresponding to the data block selected in (A) and specify the data page that is the scan target.

7. The database management system according to claim 5, wherein the data loading unit is configured to, for each data page, store two or more column values in a column corresponding to the data page from among the plurality of column values recorded in the one or more records determined in (P) in accordance with a compression system corresponding to the data page.

8. The database management system according to claim 7, wherein the data loading unit is configured to, in (P):
(p1) acquire a record;
(p2) determine whether or not a size after storage of data including the record and a record already acquired is equal to or smaller than a size of a data block that is a storage destination; and
(p3) when a result of the determination in (p2) is positive, further execute (p1) and (p2), but
when the result of the determination in (p2) is negative, the data loading unit executes (Q).

9. A database management system, comprising:

a database having a plurality of records and a plurality of blocks; and at least one processor configured to execute at least one program to perform the steps of:

accepting a query; and executing the query and issue, in executing the query, an I/O request to the database, wherein each of the plurality of data blocks includes a plurality of data pages storing a plurality of column values, of columns, recorded in one or more records corresponding to the data block, wherein each of the plurality of data pages stores two or more column values in one column corresponding to the data page, wherein each of the plurality of data blocks has management information associated with the corresponding data block and the management information provides a relationship between the plurality of data pages in the data block and the columns and the one or more records, wherein the at least one processor is further configured to execute the at least one program to further perform the steps of:

(A) selecting a data block from the plurality of data blocks; and (B) specifying a data page, which is a scan target, from the data block selected in (A) by using the management information, wherein the management information includes directory information, wherein the directory information represents, for each of the plurality of data pages included in the data block corresponding to the management information including the directory information, an ID of a column corresponding to the data page, and an ID of one or more records in which two or more column values on the data page are recorded, wherein the at least one processor is further configured to execute the at least one program to further perform the steps of, in (B), referring to the management information corresponding to the data block selected in (A) and specifying the data page that is the scan target, wherein for each of the plurality of data blocks, at least directory information in the management information corresponding to the data block is stored in a consecutive area of an external storage apparatus storing at least a part of the database, wherein the at least one processor is further configured to execute the at least one program to further perform the step of, by issuing a single read request of directory information in the management information corresponding to the data block selected in (A), reading the directory information from the external storage apparatus, and wherein the directory information referred to in (B) is the read directory information.

10. A database management system, comprising:

a database having a plurality of records and a plurality of blocks; and at least one processor configured to execute at least one program to perform the steps of:

accepting a query; and executing the query and issue, in executing the query, an I/O request to the database, wherein each of the plurality of data blocks includes a plurality of data pages storing a plurality of column values, of columns, recorded in one or more records corresponding to the data block, wherein each of the plurality of data pages stores two or more column values in one column corresponding to the data page, wherein each of the plurality of data blocks has management information associated with the corresponding data block and the management information provides a relationship between the plurality of data pages in the data block and the columns and the one or more records, wherein the at least one processor is further configured to execute the at least one program to further perform the steps of:

(A) selecting a data block from the plurality of data blocks; and (B) specifying a data page, which is a scan target, from the data block selected in (A) by using the management information, wherein the management information includes directory information, wherein the directory information represents, for each of the plurality of data pages included in the data block corresponding to the management information including the directory information, an ID of a column corresponding to the data page, and an ID of one or more records in which two or more column values on the data page are recorded, wherein the at least one processor is further configured to execute the at least one program to further perform the steps of, in (B), referring to the management information corresponding to the data block selected in (A) and specifying the data page that is the scan target, wherein for each of one or more data blocks, compressed data, which is data obtained by compressing two or more column values, is stored in each of one or more data pages in the data block, wherein for each of the one or more data blocks, the management information associated with the data block includes information representing a compression system with respect to each data page in the data block, and wherein the at least one processor is further configured to execute the at least one program to further perform the steps of, in (B), referring to the management information corresponding to the data block selected in (A) to specify a compression system corresponding to the data page that is the scan target, and processing data in the data page, which is the scan target, in accordance with the specified compression system.

11. A database server coupled to a database having a plurality of records and including a plurality of blocks, the database server comprising:
at least one processor configured to execute at least one program to execute a query and issue, in executing the query, an I/O request to the database; and
a memory in which data that is an I/O target in accordance with the I/O request is at least temporarily stored,
wherein each of the plurality of data blocks includes a plurality of data pages storing a plurality of column values, of columns, recorded in one or more records corresponding to the data block,
wherein each of the plurality of data pages stores two or more column values in one column corresponding to the data page,
wherein each of the plurality of data blocks has management information associated with the corresponding data block and the management information provides a relationship between the plurality of data pages in the data block and the columns and the one or more records, and
the at least one processor is configured to execute the at least one program to perform the steps of:
(A) selecting a data block from the plurality of data blocks; and
(B) specifying a data page, which is a scan target, from the data block selected in (A) by using the management information,
wherein the management information includes directory information,
wherein the directory information represents, for each of the plurality of data pages included in the data block corresponding to the management information including the directory information, an ID of a column corresponding to the data page, and an ID of one or more records in which two or more column values on the data page are recorded,
wherein the at least one processor is further configured to execute the at least one program to further perform the steps of, in (B), referring to the management information corresponding to the data block selected in (A) and specifying the data page that is the scan target,
wherein each of the plurality of data blocks includes at least a part of the management information corresponding to the data block,
wherein each of the plurality of data blocks includes all of the management information corresponding to the data block, and
wherein the at least one processor is further configured to execute the at least one program to further perform the steps of:
by issuing a read request of the data block selected in (A) to an external storage apparatus storing at least a part of the database, reading the selected data block from the external storage apparatus, and storing a plurality of data pages and management information in the read data block into a memory area, and
in (B), referring to the management information stored in the memory area and specify the data page, which is the scan target, from the plurality of data pages stored in the memory area.

12. A database management method, comprising:
(X) accepting a query; and
(Y) issuing, in executing the query, an I/O request to a database having a plurality of records,
wherein the database includes a plurality of data blocks,
wherein each of the plurality of data blocks includes a plurality of data pages storing a plurality of column values, of columns, recorded in one or more records corresponding to the data block,
wherein each of the plurality of data pages stores two or more column values in one column corresponding to the data page,
wherein each of the plurality of data blocks has management information associated with the corresponding data block and the management information provides a relationship between the plurality of data pages in the data block and the columns and the one or more records, and
wherein in (Y):
(A) a data block is selected from the plurality of data blocks; and
(B) a data page that is a scan target is specified from the data block selected in (A) by using the management information,
wherein the management information includes directory information,
wherein the directory information represents, for each of the plurality of data pages included in the data block corresponding to the management information including the directory information, an ID of a column corresponding to the data page, and an ID of one or more records in which two or more column values on the data page are recorded,
wherein the at least one processor is further configured to execute the at least one program to further perform the steps of, in (B), referring to the management information corresponding to the data block selected in (A) and specifying the data page that is the scan target,
wherein each of the plurality of data blocks includes at least a part of the management information corresponding to the data block,
wherein each of the plurality of data blocks includes all of the management information corresponding to the data block, and
wherein the at least one processor is further configured to execute the at least one program to further perform the steps of:
by issuing a read request of the data block selected in (A) to an external storage apparatus storing at least a part of the database, reading the selected data block from the external storage apparatus, and storing a plurality of data pages and management information in the read data block into a memory area, and in (B), referring to the management information stored in the memory area and specify the data page, which is the scan target, from the plurality of data pages stored in the memory area.

\* \* \* \* \*